United States Patent [19]

Terauds

[11] E Patent Number: Re. 32,739

[45] Reissued Date of Patent: Aug. 30, 1988

[54] FROZEN FOOD PACKAGE AND COVER LID

[75] Inventor: Oskar R. Terauds, Willoughby, Ohio

[73] Assignee: The Stouffer Corporation, Solon, Ohio

[21] Appl. No.: 5,662

[22] Filed: Jan. 21, 1987

Related U.S. Patent Documents

Reissue of:

[64] Patent No.: 4,535,889
Issued: Aug. 20, 1985
Appl. No.: 578,016
Filed: Feb. 8, 1984

[51] Int. Cl.[4] ..... B65D 1/34; B65D 43/10

[52] U.S. Cl. ..... 220/306; 150/55; 206/527; 229/2.5 R; 426/107

[58] Field of Search ..... 150/55; 206/45.34, 527; 220/258, 306, 307; 229/2.5 R, 43; 426/107, 113, 114

[56] References Cited

U.S. PATENT DOCUMENTS

| | | | |
|---|---|---|---|
| 3,347,409 | 10/1967 | Burns | 220/306 |
| 3,675,811 | 7/1972 | Artz | 220/306 |
| 3,902,540 | 9/1975 | Commisso | 150/55 |
| 3,904,074 | 9/1975 | Hoffman et al. | 220/258 |
| 3,935,962 | 2/1976 | Schubert et al. | 220/306 |
| 3,955,710 | 5/1976 | Commisso | 220/367 |
| 4,013,798 | 3/1977 | Goltsos | 426/107 |
| 4,061,241 | 12/1977 | Retelny | 220/4 B |
| 4,132,344 | 1/1979 | Jewell | 229/2.5 R |
| 4,146,170 | 3/1979 | Medendorp | 220/307 |
| 4,183,446 | 1/1980 | Davis | 220/306 |
| 4,375,862 | 3/1983 | Kurinsky et al. | 220/293 |

*Primary Examiner*—Jimmy G. Foster
*Attorney, Agent, or Firm*—Body, Vickers & Daniels

[57] ABSTRACT

A frozen food package having an easily removable and replaceable dome lid for permitting reconstitution of the frozen food either in a conventional or a microwave oven. The dome lid has an annular seating flange overlapping and disengageably locked onto the rim of a rigid bottom tray by locking ribs spaced around the flange and engaged under the tray rim. A thumb notch recess is so located in the dome lid seating flange as to permit direct engagement therethrough of the tray rim by a person's thumb along with simultaneous engagement by the fingers on the same hand with the dome lid flange at the region of an adjacent locking rib thereon. A positive separating force thereby can be applied to the tray and lid to quickly and easily unlock and separate them from one another without damage to either.

36 Claims, 5 Drawing Sheets

FROZEN FOOD PACKAGE AND COVER LID

Matter enclosed in heavy brackets [ ] appears in the original patent but forms no part of this reissue specification; matter printed in italics indicates the additions made by reissue.

BACKGROUND OF THE INVENTION

The present invention relates in general to a package or container for frozen foods and, more particularly, to a frozen food package suitable for reconstitution of the frozen food either in a conventional type oven or in a microwave oven.

In the frozen food service industry, it is known to package the frozen food in containers or packaging adapted for the reconstitution of the frozen food for serving by the heating thereof either in a microwave oven or in a conventional radiant heat type oven. To this end, it has been customary to package the frozen food in a container comprised of a molded plastic bottom tray in which the frozen food is contained. The container is then closed by a metal foil layer sealed around the rim of the bottom tray. Then a removable semi-rigid preformed dome lid or cover of plastic sheet material is attached to the tray with the rim portion of the dome lid snap locked in place around the matching contour rim of the bottom tray.

To reconstitute the frozen food within such dual heatable type packages in a conventional oven, the plastic dome lid is unlocked and removed from the tray and the latter then placed, with its intermediate metal foil sealing layer left intact, in the heated oven at the required temperature and kept therein for the necessary time period to effect the heating and desired reconstitution of the frozen food in readiness for serving. However, to reconstitute the frozen food within such dual heatable type packages in a microwave oven, the plastic dome lid must be first carefully unlocked and removed from the bottom tray without ripping, tearing, or otherwise damaging the cover, the intermediate metal foil sealing layer then removed from the bottom tray to uncover the frozen food therein, and the dome lid then reattached to the bottom tray by again snap-locking it in place around the rim thereof before placing the frozen food containing tray in place in the microwave oven for the reconstitution of the frozen food in the tray. The removal of the metal foil layer from the tray prior to placement of the tray in and energization of the microwave oven is of course necessary in order to prevent the metal foil layer from absorbing and/or blocking the microwave rays from properly penetrating into the frozen food in the tray for the desired reconstitution thereof.

With the prior type frozen food packages, the detachment of the snap-locked-on cover from the bottom tray either for heating of the tray contents in a conventional oven or removal of the foil layer prior to heating of the package in a microwave oven, has generally been a difficult and inconvenient operation to perform, sometimes resulting in a tearing or ripping of the locking rim portion of the cover such as to prevent the subsequent locked-on reattachment of the cover to the tray for heating of the reassembled package in a microwave oven. In other instances, this difficulty in removal of the dome cover from the bottom tray has resulted, after the heating of the reassembled package in a microwave oven, in the accidental dropping of the still hot to handle package and spillage of the reconstituted food contents from the bottom tray, thus constituting a loss to the user.

SUMMARY OF THE INVENTION

The present invention contemplates a new and improved frozen food package or container suitable for heating and reconstitution of the packaged frozen food either in a conventional or a microwave oven and which overcomes all of the above referred to problems and others and provides a container comprised of a bottom tray with a dome lid snaplocked thereonto which can be quickly and easily detached from the tray without damage and then snap-locked back onto the tray, for reconstitution of the frozen food in a microwave oven.

Briefly stated, in accordance with one aspect of the invention, a frozen food package or container of the conventional type as described hereinabove for heating of the frozen food contents either in a conventional or microwave oven, is provided with a thumb notch recess in the sealing flange of the dome lid, for exposing a portion of the tray rim to enable the engagement thereof by a person's thumb. The thumb notch recess is spaced around the annular extent of the seating flange of the dome lid a distance, from an adjacent one of the conventional locking ribs thereon, such as to enable the grasping, between the thumb and fingers of a person's one hand, of the tray rim as well as the sealing flange at the region of the adjacent one locking rib, for convenient and effective application of a separating force to the tray and dome lid to effect the ready separation of the tray from the dome lid without any damage to the latter such as would prevent the reattachment thereof to the tray by the locking ribs on the dome lid.

In accordance with a further aspect of the invention, the tray and dome lid and the locking ribs thereon are so constructed as to provide a quick and easy pop-off disengagement of at least one of the locking ribs on the dome lid from the rim of the tray, on application of a separating force to the tray and to the seating flange of the dome lid at the region of such one locking rib.

In accordance with a still further aspect of the invention, the tray and dome lid are of a similar generally flattened oval contour with gradually rounded corners, and the seating flange of the dome lid is provided with a tray rim engaging locking rib at each of the rounded corners of the dome lid and with a thumb notch recess located in the seating flange of the dome lid at a point approximately midway between the two locking ribs at one of the narrow ends of the dome lid, whereby to afford convenient grasping of the container and pop-off disengagement of the dome lid from the tray by either one of a person's hands.

The principal object of the invention is to provide a frozen food container of the type as referred to hereinabove and having a semi-rigid plastic dome lid which is locked onto the bottom tray of the container by locking ribs and quickly and readily detachable therefrom without causing damage to the lid in any way.

Another object of the invention is to provide a frozen food container of the type referred to above and the semirigid plastic dome lid of which is readily detachable from the tray in a wholly intact condition in all instances to enable subsequent reattachment thereto in the same locked-on manner as before.

Still another object of the invention is to provide a frozen food container of the type referred to above and the dome lid of which is characterized by quick pop-off disengagement and separation from the tray on application of an appropriate separating force to the tray and lid.

A further object of the invention is to provide a frozen food container of the type referred to above and the lock-on dome lid of which is quickly and easily disengageable and separable from the bottom tray merely by a person's single hand.

Still a further object of the invention is to provide a semi-rigid plastic dome lid for a frozen food container, which lid is provided with a thumb notch recess located in the annular seating flange of the lid in a predetermined spaced position therearound relative to one of the locking ribs on the seating flange which lock the lid onto the bottom tray of the container.

Yet another object of the invention is to provide a semi-rigid plastic dome lid of flattened oval contour for a frozen food container which lid can be stacked in nested position with other like lids.

Further objects and advantages of the invention will be apparent from the following detailed description of preferred species thereof and from the accompanying drawings.

DESCRIPTION OF THE PREFERRED EMBODIMENTS

Figure 1:
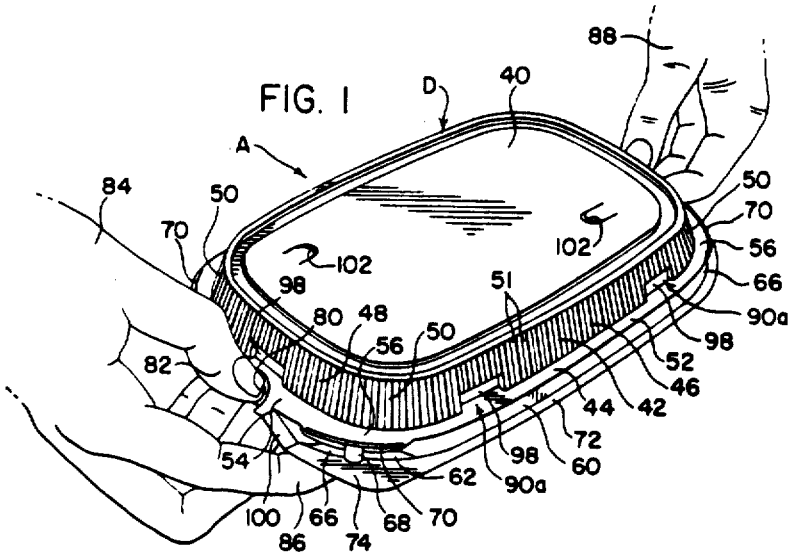
FIG. 1 is a perspective view of a dome lid comprising the invention shown mounted in place on an associated tray to form an assembled container in accordance with the invention, and showing the manner in which the dome lid may be removed from the tray.

Referring now to the drawings wherein the showings are for the purposes of illustrating a preferred embodiment of the invention only and not for the purpose of limiting same, the figures show the invention as embodied in a container or package A for frozen food. It is to be understood, however, that the invention may be utilized in other types of containers for various other materials wherever it may be found to have suitable utility therefor. The container or package A is comprised in general of a molded plastic bottom tray or food serving dish B in which the frozen food is contained, an intermediate metal foil sealing layer C overlying and sealing the frozen food filling in the tray B, and a top dome lid or cover member D detachably locked onto and replaceable on the rim of the tray B.

The bottom tray or dish B is comprised of a rigid, pressure molded plastic member of shallow dish-like shape and formed of a suitable heat resistant, ovenable, synthetic plastic material capable of withstanding temperatures of at least 425° F. or so and preferably of a pleasing coloration such as a cream color or white, for instance. A suitable material for such purpose is a fiber glass filled reinforced plastic such as is commercially available from a number of sources. The tray is molded with a wall thickness ranging, for example, from around 0.040 to 0.050 inches. In the preferred embodiment as shown in the drawings, the tray B is formed of a generally flattened oval contour with slightly convexly curved longitudinal side portions 10 and slightly convexly curved transverse end portions 12 of shorter extent than and joined to the longitudinal side portions 10 by gradually rounded corner portions 14. The tray B, however, may be of any other desired contour such as, for example, straight-sided conventional oval shape, or square or conventional rectangular type preferably with gradually rounded corners.

Figure 3:
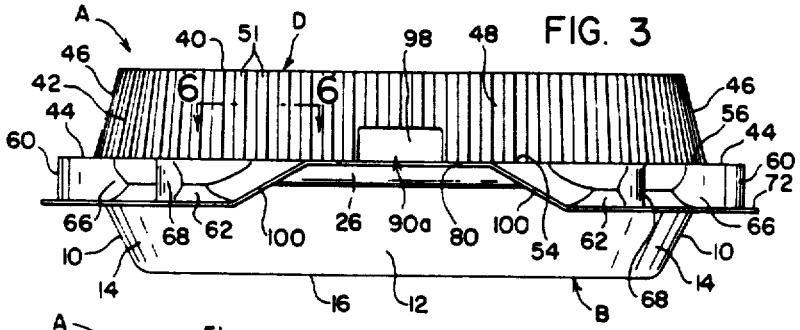
FIG. 3 is an end view of that end of the dome lid comprising the invention which is provided with a thumb notch recess.
Figure 4:
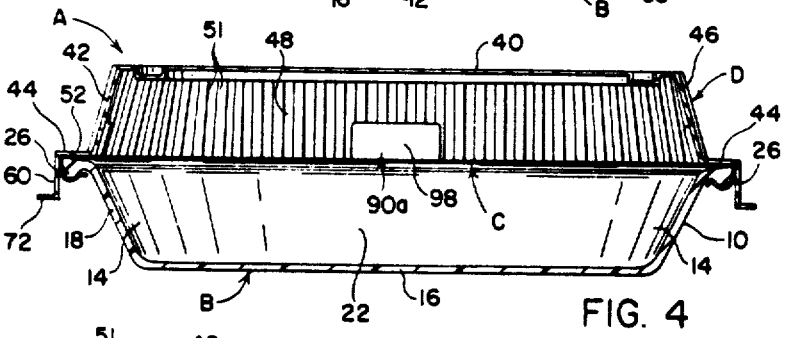
FIG. 4 is a transverse sectional view taken on the line 4—4 of FIG. 2.
Figure 5:
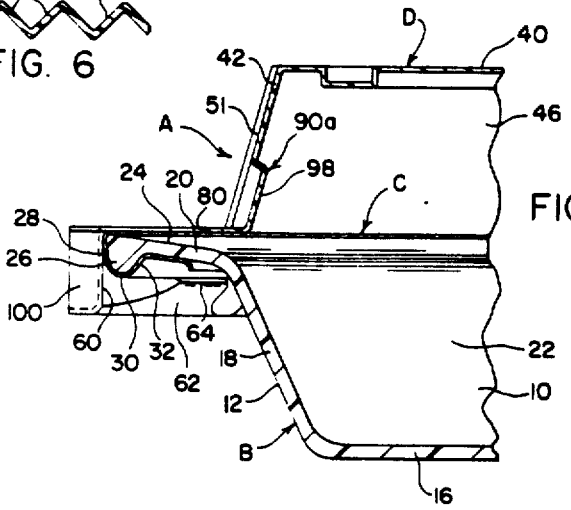
FIG. 5 is a fragmentary longitudinal sectional view on an enlarged scale on the line 5—5 of FIG. 2.

As shown in FIGS. 3–5, tray B is comprised of a flat bottom wall 16 and an upwardly and outwardly flaring annular side wall 18 provided with an annular flanged rim 20 extending laterally outward from and around the upper edge of the annular side wall 18. The bottom and side walls 16 and 18, respectively, form a tray compartment 22 within which the food to be served is contained. The flanged rim 20 is formed with a flat upper surface 24 which preferably extends from the side wall 18 at a slight upward angle of around 8° or so to the horizontal and is formed around its outer peripheral edge with a downwardly thickened reinforcing bead portion 26. The outer peripheral edge surface 28 of the beaded outer edge 26 of the tray rim flange 20 extends downwardly and inwardly from the upper surface 24 of the rim flange 20 at a slight angle of around 6° or so to the vertical and terminates in a convexly rounded under surface 30.

After the filling of the tray compartment 22 with the food to be frozen therein and eventually served after reconstitution by appropriate heating procedures, the tray compartment 20 and the food therein are sealed by a metal foil sealing layer C (FIGS. 4 and 5) such as aluminum foil of 1 mil thickness, stretched flat across the top of the tray B and the food contained therein and wrapped tightly around the beaded outer edge 26 of the flanged rim 20 of the tray B, as indicated at 32 in FIG. 5, to secure the foil layer in place thereon. Besides sealing the food in the tray from contamination from the outside, the metal foil sealing layer C serves the added purpose of preventing the drying of the frozen food in the tray B during the reconstitution of the frozen food in a conventional radiant heat type oven.

After application of the metal foil sealing layer C to the tray B, the dome lid D comprising the invention is then applied to and locked on the tray to overlie the metal foil layer C thereon (FIGS. 4 and 5). In accordance with the invention, the dome lid D is of a construction which not only affords a secure locked-on attachment thereof to the tray B but which at the same time enables the quick and easy detachment of the lid from the tray in an intact condition, i.e. without any ripping or tearing or other damage to the lid such as would be apt to prevent the subsequent reattachment of the dome lid to the tray in its original locked-on position thereon, as required in those cases where the reconstitution of the frozen food in the tray B is to be carried out in a microwave type oven.

Figure 2:
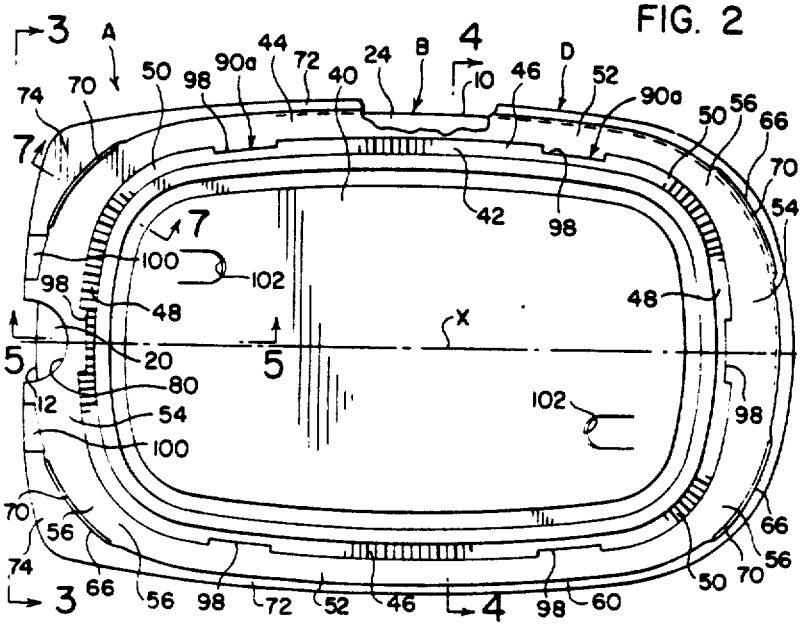
FIG. 2 is a top plan view of the assembled container shown in FIG. 1.
Figure 6:
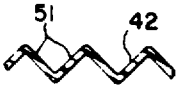
FIG. 6 is a fragmentary sectional view on an enlarged scale on the line 6—6 of FIG. 3 showing the corrugated side wall of the dome lid.

The dome lid or cover D according to the invention is comprised of a thermo-formed semi-rigid member of a plastic sheet material such as a high density polyethylene having a sheet thickness of, for example, around 0.021 inches or so and preferably of translucent character. As shown in FIGS. 1 and 2, the dome lid D is of a contour generally corresponding to that of the bottom tray B, i.e. of a flattened oval contour in the particular embodiment illustrated, and it is comprised of an essentially planar top wall 40, an outwardly flaring annular side wall 42 depending from the peripheral edge of the top wall at a slight angle of around 15° or so to the vertical, and an annular seating flange 44 extending laterally outward from the lower peripheral edge of the side wall 42. In the particular embodiment of the invention illustrated wherein the lower tray is of flattened oval contour as described above, the flaring side wall 42 is of generally flattened oval contour similar to that of the bottom tray B, with the side wall 42 having slightly convexly curved longitudinal side portion 46 of extended length and slightly convexly curved transverse end portions 48 of shorter extent than and joined to the longitudinal side portions 46 by gradually rounded corner portions 50. To prevent crushing of the relatively weak dome of the lid D, as when food containing assembled containers A are stored one on top of one another in packing cartons or in store display freezers, the flaring side wall 42 of the dome lid is provided substantially completely therearound with side-by-side V-shape corrugations or strengthening ribs 51, as shown in detail in FIG. 6. The seating flange 44 of the dome lid D likewise is of generally flattened oval contour matching that of, and adapted to seal against, the upper surface 24 of the flanged rim 20 of the bottom tray B. Seating flange 44 is comprised of slightly convexly contoured longitudinal side portions 52 of extended length and slightly convexly contoured transverse end portions 54 of shorter extent than and joined to the side portions 52 by gradually convexly rounded corner portions 56.

Figure 7:
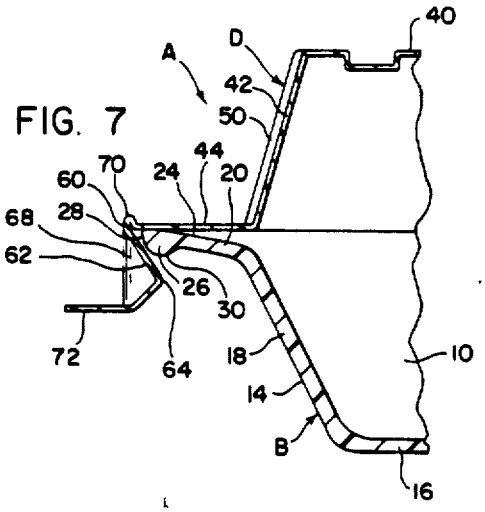
FIG. 7 is a fragmentary sectional view on an enlarged scale taken on the line 7—7 of FIG. 2 showing the locking arrangement for attaching the dome lid to the bottom tray of the container.
Figure 7A:
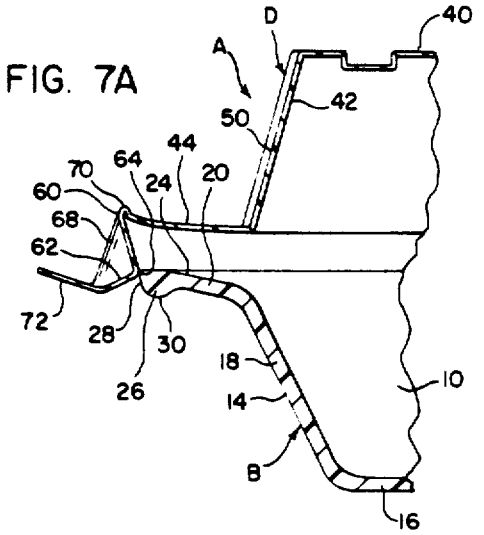
FIG. 7A is a sectional view similar to FIG. 7 but showing the dome lid deformed at one of the locking ribs thereof to disengage it from the bottom tray.
Figure 8:
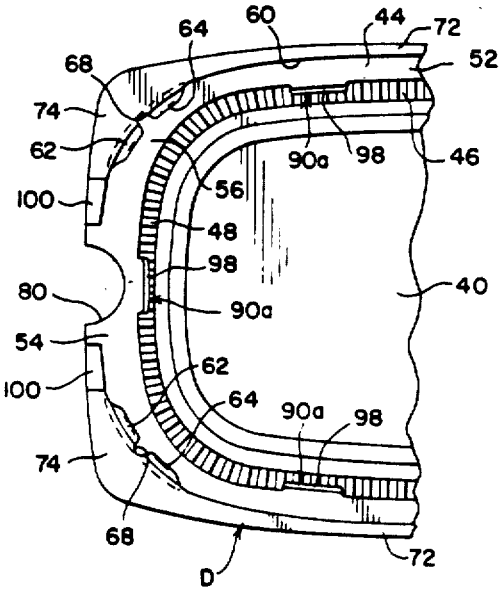
FIG. 8 is a fragmentary bottom view of the dome lid comprising the invention and showing the locking rib indents therein for attaching the dome lid to the bottom tray.

The seating flange 44 of the dome lid D is provided around its outer peripheral edge with a depending locking flange 60 closely surrounding and fitting around the flanged rim 20 of the bottom tray B, as shown in FIG. 4. The locking flange 60 is provided with a plurality of inwardly projecting locking ribs 62 at widely spaced regions therearound which snap over the beaded outer peripheral edge 28 of the tray rim 20, during the attachment of the dome lid D onto the tray B, and fit under the rounded underside 30 of the beaded rim edge 26, as shown in FIG. 7, to lock the dome lid securely in place on the bottom tray B. The locking ribs 62 extend along the rounded corner portions of the circumferential extent of the locking flange 60 and they are formed by inward indents therein of V-shaped vertical section with rounded apices 64, as shown in FIGS. 7 and 7A. In the preferred embodiment of the invention as shown in FIGS. 1 through 9 wherein the container A is of flattened oval contour with gradually rounded corners, one of the locking ribs 62 is provided at each of the four rounded corner portions 66 of the locking flange 60 and they extend an appreciable distance around the corner portions.

Approximately midway of the longitudinal extent of each locking rib 62 around the rounded corner portions 66 of the locking flange 60, the V-section locking ribs 62 are each provided with a vertical strengthening rib 68 which extends transversely across the V-groove formed in the locking flange 60 by the V-shaped locking rib indent therein. The ribs 68 serve to reinforce the locking ribs 62 to maintain them in their formed V-shape especially during the attachment of the dome lid to the tray and the detachment therefrom. Also, the jointure portions of the seating and locking flanges 44 and 60 are upwardly upset a slight amount, along the rounded corner portions 66 of the locking flange directly above each of the locking ribs 62, to form doubled-back strengthening ribs 70 of double wall thickness, as shown particularly in FIG. 7, which serve to stiffen the relatively thin seating flange in its thickness direction at such corner portions 66 against distortioning forces applied thereto.

To strengthen the locking flange 60 against laterally outward deformation at its lower edge and also enable convenient manual application of a lifting force to the locking flange to effect the separation of the dome lid D from the bottom tray B, the locking flange is provided therearound with a narrow rigidifying flange 72 extending laterally outward from the lower peripheral edge portion of the locking flange. As shown in FIG. 2, this rigidifying flange 72, in the case of the particular embodiment of the invention therein shown, may be flared outwardly in contour to a greater lateral width at the two rounded corners of the dome lid at one of the narrow ends thereof, to provide finger engageable wing portions or lift means 74 on the dome lid D for applying a lifting force thereto at the region of the adjacent locking ribs 62.

To detach and separate the dome lid D from the bottom tray B of the assembled container A, as is necessary for the reconstitution of the contained frozen food for serving by heating either in a conventional or a microwave oven, a separating force couple is manually applied to the attached tray and dome lid, at a region adjacent at least one of the locking ribs 62 on the dome lid, acting to locally deform the seating flange 44 and locking flange 60 as shown in FIG. 7A and cause a sufficient degree of laterally outward deformation of the flange 60 at such region or regions for the particular locking rib or ribs 62 thereat to clear and disengage from under the beaded outer peripheral edge 26 of the tray rim 20. This disengagement of the particular one or more locking rib or ribs 62 from the tray then frees the remaining other locking ribs 62 on the dome lid from engagement with the tray rim 20, thus enabling the complete lifting off and separation of the dome lid from the bottom tray. With prior known frozen food packages, however, which are adapted for reconstitution of the frozen food either in a conventional or a microwave oven and provided with locking ribs on the dome lid similar to the locking ribs 62 on the dome lid D comprising the invention, the application of the necessary separating force to the dome lid and bottom tray could not be effectively nor conveniently applied thereto. As a result, the separation of the dome lid from the bottom tray of such prior containers not only has been accomplished with great difficulty and annoying inconvenience, but also has sometimes resulted in the ripping and tearing or other damage to the thin plastic sheet material of the dome lid and its seating flange such as then prevented the subsequent reattachment thereof to the bottom tray in the same manner as previously, for proper reconstitution of the frozen food in a microwave oven. Moreover, the necessity for repeating this difficult and inconvenient dome lid and tray separating operation after the reconstitution of the frozen food in a microwave oven, to permit the serving of the heated food, previously resulted in some instances in the accidental dropping of the still hot-to-handle dome lid and tray members of such prior frozen food containers with accompanying spillage and loss of the heated food.

In accordance with a principal feature of the present invention, the seating flange 44 of the dome lid D is provided with an outwardly opening thumb notch recess 80 in the outer peripheral edge thereof for exposing a portion of the tray rim 20 through such recess. For the purposes of the invention, and as shown more particularly in FIG. 1, the thumb notch recess 80 is spaced around the annular extent of the seating flange 44 a distance, from an adjacent one of the locking ribs 62 on the locking flange 60 of the dome lid D such as to enable the engagement, through the recess 80, of the upper surface 24 of the flanged rim 20 of the tray B by the thumb 82 of a person's hand 84 while enabling the simultaneous engagement of the fingers 86 of the same hand with the underside of the locking flange 60 on the dome lid D at a region outwardly adjacent such adjacent one locking rib 62, such as with one of the wing extensions 74 on the flange 60. The convenient and direct application to the tray and dome lid of the necessary separating force couple required to effect the separation thereof from one another is thus made possible.

The lifting action imparted to the locking flange 60 by the person's fingers 86 during the separation of the dome lid from the tray causes the seating flange 44 to be deformed upwardly and the locking flange to be deformed laterally outward, at the region of the particular adjacent one locking rib 62, a sufficient distance as shown in FIG. 7A for this one locking rib to clear the outer peripheral edge 28 of and disengage from under the beaded outer edge portion 26 of the tray rim 20, thus unlocking and freeing the portion of the locking flange 60 at this one locking rib from the tray rim 20. The freeing of this one locking rib 62 from the tray 20 and the resulting partial separation of the dome lid from the tray at such one locking rib then operates to loosen the attachment of the dome lid to the bottom tray by the other locking ribs 62 of the dome lid a sufficient amount to permit the ready lift-off and separation of the dome lid from the bottom tray.

The positioning in accordance with the invention of the thumb notch recess or opening 80 in the above described particular spaced position, around the annular extent of the sealing flange 44, relative to an adjacent one of the locking ribs 62 on the locking flange 60 is of especial advantage and importance because it enables the convenient and easy application to the tray and dome lid of the necessary separating force couple, by a person's one hand, directly and positively to the tray and dome lid and also at a particularly advantageous region around the annular extent of the locking flange, i.e. at the region adjacent one of the locking ribs 62. As a result, a quick and easy separation of the dome lid from the bottom tray is effected without any damage to the relatively flimsy seating and locking flanges 44 and 60 such as a ripping or tearing thereof which conceivably could prevent the subsequent reattachment of the dome lid in its proper original seated and locked position on the flanged rim 20 of the bottom tray B for reconstitution of the frozen food in a microwave oven. Moreover, the quick and easy manner in which the dome lid D according to the invention can be separated from the bottom tray B is of further advantage, in those cases where the frozen food in the container A is reconstituted by heating in a microwave oven, since it greatly minimizes the possibility of the still hot-to-handle reconstituted food-containing package A being accidentally dropped during the removal of the dome lid D, with possible spillage and loss of the heated food.

In the preferred embodiment of the invention as shown in FIGS. 1 and 2 wherein the dome lid D is of essentially flattened oval contour with gradually rounded corners and with a locking rib 62 at each of the rounded corners, the thumb notch recess or opening 80 as described above is located, as shown, at one of the narrower ends of the dome lid within that particular transverse end portion 54 of the seating flange 44 at such end of the lid, and preferably at a region of the seating flange 44 approximately midway between the two adjacent locking ribs 62 and the wing extensions 74 at the corresponding end of the dome lid and centered on the longitudinal center axis X of the dome lid. As so located on the dome lid D of containers A which are of the conventional sizes employed in present commercial frozen food service, the thumb notch recess 80 will then be located in the previously described particular spacial position around the seating flange 44 relative to the two locking ribs 62 at the adjacent rounded corners of the dome lid such as to enable the simultaneous engagement of the thumb 82 and fingers 86 of either the right or left hand 84 of a person desiring to remove the dome lid D respectively with the tray rim 20 through the thumb notch recess 80 and with one or the other of the wing extensions 74 on the locking flange 60 at the region thereof adjacent one or the other of the adjacent locking ribs 62 on the locking flange, for application of the necessary separating force couple directly to the tray and dome lid. During the application of this separating force couple to the tray rim 20 and locking flange 60 at one end of the container A by a person's hand 84, the container conveniently may be held at its other end in the person's other hand 88, as shown in FIG. 1.

If desired, the seating flange 44 of the dome lid D of a flattened oval contour form of container A as shown in FIGS. 1 and 2 may be provided with a thumb notch recess 80 at each of the narrower ends of the dome lid and located on the longitudinal center axis X thereof. Such a modification enables the unlocking and separation of the dome lid from the bottom tray at both of two corner portions thereof at opposite ends of the container A by the use of both of a person's hands 84 and 88 to each apply a separating force couple as described above to the tray and dome lid.

A particular advantage afforded by the preferred embodiment of the invention shown in FIGS. 1-9 is that the unlocking of any one of the locking ribs 62 from the tray rim 20, by the application of the separating force couple directly to the tray rim and to the locking flange 60 of the dome lid, is accompanied by a sudden, positive, pop-off disengagement of such one locking rib from the tray rim such as greatly simplifies and hastens the separation of the dome lid from the tray. The downwardly and inwardly inclined outer peripheral edge 28 of the tray rim 20 facilitates this positive pop-off disengagement action of the locking rib 62 from the tray rim 20 by exerting a camming action on the V-shaped locking rib, as will be evident from FIGS. 7 and 7A, acting to readily deform the region of the locking flange 60 at such locking rib laterally outward so as to enable the locking rib to clear the outer peripheral edge 28 of the tray rim and cause it to pop or snap off the tray rim during the continued application of the separating force couple to the tray rim and to the dome lid to deform the seating flange 44 thereof.

Figure 9:
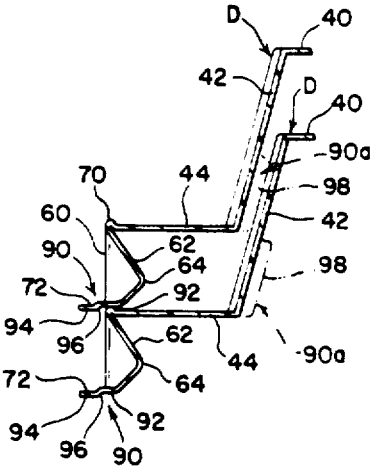
FIG. 9 is a fragmentary sectional view of a number of dome lids comprising the invention shown stacked in nested relation one within another.

To enable stacking of a plurality of the dome lids D in properly centered and non-tilted nested relation one within another such as may be required in automatic devices used in food processing plants for feeding and mounting the dome lids in locked position onto respective trays B previously filled with food to be frozen therein, the dome lids D are preferably provided with suitable interfitting and interengaging stacking shoulder means 90, as shown in FIG. 9. In the particular case therein illustrated, the stacking shoulder means 90 is comprised of a plurality of slightly upwardly offset seating shoulders 92 formed in the underside 94 of the rigidifying flange 72 along the inward edge thereof and corresponding in number to and generally coextensive with the locking ribs 62 on the locking flange 60. The offset seating shoulders 92 afford corresponding shallow aligning shoulders 96 located in the underside 94 of the rigidifying flange 72 and facing laterally inward of the dome lid D. When the dome lids D are nested together in stacked relation one within another, the seating shoulders 92 of each dome lid abut or rest against the outer rim portions of the seating flange 44 of the next adjacent dome lid nested therein, as shown in FIG. 9, to thereby support the dome lids in proper vertically spaced nested relation with one another. At the same time, the laterally inward facing aligning shoulders 96 in the underside 94 of the flange 72 on each dome lid D fit closely over and around the outer peripheral edge of the seating flange 44 of the next adjacent dome lid nested therein, as shown in FIG. 9, to thereby laterally center the stacked dome lids D with one another so as to be in vertically aligned stacked relation.

To further aid in assuring the stackability of the dome lids D in properly aligned non-tilted relation with one another, the corrugated side wall 42 of the dome lid may be provided with additional interengaging stacking shoulder means 90a comprising a plurality of inwardly projecting aligning indents 98 located in the side wall 42 at widely spaced regions therearound, as shown in FIGS. 1 and 2 and in phantom in FIG. 9. The indents 98 abut against and engage the side wall 42 of a nested one of the dome lids D. FIG. 9. The indents 98 are formed in the side wall 42 at the bottom region thereof where it joins with the seating flange 44, and they preferably are of rectangular configuration with their bottom walls formed as a continuation of the seating flange 44. In the preferred embodiment of the invention as shown in FIGS. 1 and 2 wherein the dome lid D is of a generally flattened oval configuration, two of the aligning indents 98 are provided in each of the longitudinally extending longer sides 46 of the side wall 42 near the opposite ends thereof while a single such indent 98 is provided in each of the shorter transverse ends 48 of the side wall 42 at a location on the axis X of the dome lid.

To facilitate the formation or the cutting out of a thumb notch recess 80 in the seating flange 44, at one or both of the transverse narrow ends of the dome lid D, the locking flange 60 and associated rigidifying flange 72 thereof are discontinued or interrupted at the region of the seating flange 44 where one of the thumb notch recesses 80 is to be formed, thereby to avoid the need for extending the formation of the thumb notch recess 80 also through the vertical extent of the locking flange 60 and the lateral extent of the rigidifying flange 72. To this end, the portions of the rigidifying flange 72 and bottom edge of the locking flange 60 which extend between the locking ribs 62 and each adjacent thumb notch recess 80 are corresponding tapered upwardly or inclined at a slight angle, as shown at 100 in FIGS. 1 and 3, to meet with the seating flange 44 just short of the thumb notch recess 80 therein so that this recess 80 then need be cut or formed only through the single thickness of the seating flange 44 alone. By joining with the seating flange 44 at points near the thumb notch recess 80 therein, the inclined portions 100 of th flange 72 thus serve as brace means to reinforce and stiffen the seating flange 44 at such points against flexure and so maintain the positive seating engagement thereof with the tray rim 20 at the regions thereof adjacent the recess 80.

In accordance with customary practice, the top wall 40 of the dome lid D is preferably provided with one or more vent openings 102 punched out of the top wall at suitable spaced apart regions thereof to provide relief ports for the escape of heated vapors from within the dome lid and so prevent the build-up of excessive and possibly dangerous pressures therein during the reconstitution of the frozen food in container A within a microwave type oven.

Figure 10:
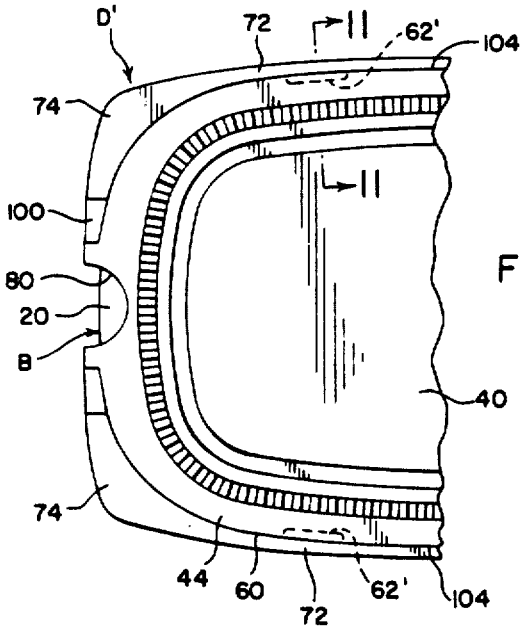
FIG. 10 is a fragmentary plan view of a container provided with a modified form of dome lid comprising the invention; and, FIG. 11 is a fragmentary sectional view on an enlarged scale taken on the line 11—11 of FIG. 10.
Figure 11:
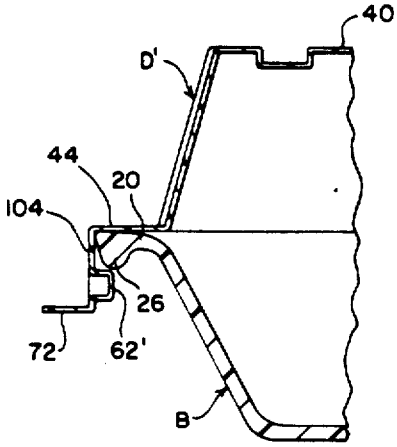

FIG. 10 illustrates a modified form of dome lid D' according to the invention wherein the locking ribs 62', rather than extending along the rounded corner portions of the locking flange 60 as in the embodiment shown in FIGS. 1-9, are provided instead in the longitudinally extending side portions 104 of the locking flange 60. As shown, two of the locking ribs 62' are provided within, and near the opposite ends of each longitudinal side portion 104 of the locking flange 60. Thus, the finger-engageable wing portions 74 of the rigidifying flange 72 on locking flange 60 are still located near enough to the adjacent locking ribs 62' in the side portions 104 of locking flange 60 to assure the quick and easy positive disengagement of a respective one of the locking ribs 62' from underneath the tray rim 20 on application of the aforementioned separating force to the tray B and to one or the other of the wing portions 74 on the dome lid D in the manner as described hereinabove. The locking ribs 62' shown in FIG. 11 are of somewhat different form from the locking ribs 62 in FIGS. 1-9 in that they are of box-like cross-sectional shape rather than of the V-shaped cross-sectional form of the ribs 62.

The invention has been described with reference to a preferred embodiment. Obviously, modifications and alterations will occur to others upon the reading and understanding of this specification. It is my intention to include all such modifications and alterations insofar as they come within the scope of the appended claims or the equivalents thereof.

Having thus described the invention, it is claimed:

1. In a container comprised of a molded rigid plastic bottom tray with a surrounding laterally outward extending flanged rim of generally rectangular contour with gradually rounded corner portions, and an upper dome lid comprised of a semi-rigid sheet-like member of plastic material having a laterally outward extending annular seating flange matching the contour of, and seated against the upper surface of and locked onto the said rim of the tray, to join the tray and dome lid together into a unitary assembly, the said seating flange having a depending locking flange closely fitting around the flanged rim of the tray and having gradually rounded corner portions matching the said rounded corner portions of said flanged rim, and the said locking flange being provided with a plurality of inwardly projecting locking rib means spaced therearound and engaged with the tray rim under the peripheral outer edge thereof to lock the dome lid in place on the tray, the improvement comprising: said locking rib means being located within the peripheral extent of respective ones of the said rounded corner portions of said locking flange, and said seating flange having an outwardly opening thumb notch recess in the outer peripheral edge thereof exposing a portion of the said tray rim through said recess, said thumb notch recess being spaced around the said seating flange a distance, from one of said locking rib means, such as to enable engagement through said thumb recess of the said flanged rim of the tray by the thumb of a person's hand while at the same time enabling engagement of the fingers of the person's same hand with the underside of the said locking flange of the dome lid, at a region outwardly adjacent the said one locking rib means, for application of a separating force couple directly and normal to the flanged rim of the tray and the said locking flange to disengage the said one locking rib means from the tray rim.

2. In a container as defined in claim 1, wherein the said one locking rib means and peripheral out edge of the tray rim undergo a pop-off disengagement from one another on application of the said separating force couple to said tray and locking flange.

3. In a container as defined in claim 1, wherein the said tray is covered by an intermediate metal foil sealing layer extending between and completely around the peripheral extent of the engaged said tray rim and seating flange of the dome lid and wrapped around the outer peripheral edge portion of the tray rim to seal the said bottom tray.

4. In a container as defined in claim 1, wherein the said dome lid comprises a planar top wall, an outwardly flaring depending annular side wall, and the said annular seating flange extending laterally outward from the lower peripheral edge of the said side wall, said flaring side wall being formed therearound with a multiplicity of strengthening ribs extending from top to bottom of said side wall to rigidify the dome lid against crushing under applied loads.

5. In a container as defined in claim 4, wherein the said strengthening ribs in the said flaring side wall of the dome lid comprise side-by-side V-shaped corrugations formed substantially completely around and respectively extending from top to bottom of said flaring side wall.

6. In a container as defined in claim 5, wherein the said tray is covered by an intermediate metal foil sealing layer extending between and completely around the peripheral extent of the tray rim and the said seating flange, and wrapped around the outer peripheral edge portion of the tray rim to seal the said bottom tray.

7. In a container as defined in claim 1, wherein the said bottom tray and dome lid and their respective engaged said flanged rim and seating flange and said locking flange all are of a generally flattened oval contour with gradually rounder corner portions, and wherein said thumb notch recess is located in said seating flange approximately midway between the two said locking rib means at one of the narrow ends of the said dome lid.

8. In a container as defined in claim 7, wherein the said one locking rib means and peripheral outer edge of the tray rim undergo a pop-off disengagement from one another on application of the said separating force couple to the said tray and locking flange.

9. In a container as defined in claim 7, wherein the said tray is covered by an intermediate metal foil sealing layer extending between and completely around the peripheral extent of the engaged said tray rim and seating flange of the dome lid, and wrapped around the outer peripheral edge portion of the tray rim to seal the said bottom tray.

10. In a container as defined in claim 7, wherein the said dome lid comprises a planar top wall, an outwardly flaring depending annular side wall, and the said annular seating flange extending laterally outward from the lower peripheral edge of the said side wall, said flaring side wall being formed with strenghtening ribs comprising side-by-side V-shaped corrugations formed substantially completely around and respectively extending from top to bottom of said flaring side wall.

11. In a container as defined in claim 7, wherein the said seating flange of the dome lid is provided with a said thumb notch recess at each of the narrow ends of the said dome lid.

12. In a container as defined in claim 1, wherein the said depending locking flange on the dome lid is formed with a protruding wing portion extending laterally outward from the lower peripheral edge of said locking flange at the region thereof formed with the said adjacent one of said locking rib means to provide a finger actuatable lift means on the dome lid.

13. In a container as defined in claim 7, wherein the said depending locking flange on the dome lid is formed with protruding wing portions respectively extending laterally outward from the lower peripheral edge of said locking flange at the said rounded corner portions thereof provided with the said two locking rib means at the said one narrow end of the dome lid, said wing portions forming finger actuatable lift means on the dome lid.

14. In a container as defined in claim 8, wherein the said depending locking flange on the dome lid is formed with protruding wing portions respectively extending laterally outward from the lower peripheral edge of said locking flange at the said corner regions thereof provided with the said two locking rib means at the said one narrow end of the dome lid, said wing portions forming finger actuatable lift means on the dome lid.

15. In a container as defined in claim 9, wherein the said depending locking flange on the dome lid is formed with protruding wing portions respectively extending laterally outward from the lower peripheral edge of said locking flange at the said corner regions thereof provided with the said two locking rib means at the said one narrow end of the dome lid, said wing portions forming finger actuatable lift means on the dome lid.

16. In a container as defined in claim 10, wherein the said depending locking flange on the dome lid is formed with protruding wing portions respectively extending laterally outward from the lower peripheral edge of said locking flange at the said corner regions thereof provided with the said two locking rib means at the said one narrow end of the dome lid, said wing portions forming finger actuatable lift means on the dome lid.

17. In a container as defined in claim 7, wherein the said depending locking flange on the dome lid is provided therearound with a narrow rigidifying flange extending laterally outward from the lower peripheral edge portion of said locking flange and flared outwardly to a greater width, at the regions adjacent the said two locking rib means at the said one narrow end of the dome lid, to provide finger actuatable lift means on the dome lid.

18. In a container as defined in claim 7, wherein the said locking rib means at each of the said rounded corner portions of said locking flange are comprised of inward V-shaped groove indents therein and extend an appreciable distance around the said rounded corner portions, each of said locking rib groove indents being reinforced medially of their length by a vertical strengthening rib formed in said locking flange, said strengthening ribs being located within and extending transversely across the V-grooves of the said V-shaped locking rib groove indents therein.

19. In a container as defined in claim 7, wherein the said flanged rim of the tray is formed with a beaded peripheral outer edge having a downwardly and inwardly inclined outer edge surface with a rounded underside, and each of said inwardly projecting locking rib means on the said depending locking flange of the dome lid is of inward V-shaped form in vertical section with a rounded apex.

20. In a container as defined in claim 1, wherein those portions of the junctures of the said seating and locking flanges which overlie the said locking rib means in the locking flange are upwardly extended to form essentially double wall thickness upward strengthening rib portions on the seating flange of the dome lid.

21. In a container as defined in claim 7, wherein those portions of the junctures of the said seating and locking flanges which overlie the said locking rib means on the locking flange are upwardly extended to form essentially double wall thickness upward strengthening rib portions on the seating flange of the dome lid.

22. A dome lid for locking attachment onto a bottom tray having a surrounding laterally outward extending flanged rim of generally rectangular contour with gradually rounded corner portions, said lid comprising a semi-rigid sheet-like member of plastic material having a laterally outward extending annular seating flange matching the contour of and adapted for seating against the upper surface of and locking onto the said rim of the tray, said seating flange having a depending locking flange for fitting closely around the flanged rim of the tray and having gradually rounded corner portions matching the said rounded corner portions of said flanged rim, said locking flange being provided with a plurality of inwardly projecting locking rib means spaced therearound and located within the peripheral extent of respective ones of the said rounded corner portions of said locking flange for engagement with the tray rim under the peripheral outer edge thereof to lock the dome lid in place on the tray, and said seating flange having an outwardly opening thumb notch recess in the outer peripheral edge thereof for exposing therethrough a portion of the tray rim, said thumb notch recess being spaced around the said seating flange a distance, from one of said locking rib means, such as to enable engagement through said thumb notch recess of the flanged rim of the tray by the thumb on a person's hand while enabling simultaneous engagement of the fingers on the same hand with the underside of said locking flange, at a region outwardly adjacent the said one locking rib means, for application of a separating force couple directly and normal to the flanged rim of the tray and said locking flange to disengage the said one locking rib means from the tray rim

23. A dome lid as defined in claim 22, wherein the said one of said locking rib means on said lid undergoes a pop-off disengagement from the tray rim on application of the said separating force couple to the tray rim and said locking flange of the lid.

24. A dome lid as defined in claim 22, and including a planar top wall, an outwardly flaring depending annular side wall, and the said annular seating flange extending laterally outward from the lower peripheral edge of the said side wall, said flaring side wall being formed therearound with side-by-side V-shaped corrugations extending from top to bottom of said side wall.

25. A dome lid as defined in claim 22, wherein the said locking flange on said seating flange is discontinuous across the annular extent of said seating flange formed with said thumb notch recess.

26. A dome lid as defined in claim 22, wherein the said seating and locking flanges are of generally flattened oval contour with gradually rounded corner portions, and wherein said thumb notch recess is located in said seating flange approximately midway between the two said locking rib means at one of the narrow ends of the said dome lid.

27. A dome lid as defined in claim 26, wherein the said one of said locking rib means on said lid undergoes a pop-off disengagement from the tray rim on application of the said separating force couple to the tray rim and said locking flange of the lid.

28. A dome lid as defined in claim 26, wherein the said seating flange of the dome lid is provided with a said thumb notch recess at each of the narrow ends of the said lid.

29. A dome lid as defined in claim 26, wherein the said depending locking flange is formed with protruding wing portions respectively extending laterally outward from the lower peripheral edge of said locking flange at the said rounded corner portions thereof provided with the said two locking rib means at the said one narrow end of the lid, said wing portions forming finger actuatable lift means on the dome lid.

30. A dome lid as defined in claim 26, wherein the said depending locking flange is provided therearound with a narrow rigidifying flange extending laterally outward from the lower peripheral edge portion of said locking flange and flared outwardly to a greater width, at the regions adjacent the said two locking rib means at the said one narrow end of the lid, to provide finger actuatable lift means on the lid.

31. A dome lid as defined in claim 26, wherein the said locking flange on said seating flange is discontinuous across the annular extent of said seating flange formed with said thumb notch recess.

32. A dome lid as defined in claim 26, wherein the said locking rib means at each of the said rounded corner portions of said locking flange are comprised of inward V-shaped groove indents therein and extend lengthwise part way around the said rounded corner portions of the locking flange.

33. A dome lid as defined in claim 26, wherein those portions of the junctures of the said seating and locking flanges which overlie the said locking rib means on the locking flange are upwardly extended to form essentially double wall thickness upward strengthening rib portions on the seating flange of the dome lid.

34. In a container as defined in claim 1, wherein the said inwardly projecting locking rib means on said locking flange are of V-shaped form and extend lengthwise along the respective said rounded corner portions thereof, the sloping faces of said locking rib means camming against the said peripheral outer edge of the tray rim, on application of said separating force couple to the said tray rim and locking flange, to distort the rounded corner portion of the locking flange at the said one locking rib means in a laterally outward direction so as to disengage said rib means from under the tray rim and effect the separation of the lid from the tray at said rounded corner portion.

*35. In a container comprised of a molded rigid plastic bottom tray with a surrounding laterally outward extending flanged rim and an upper dome lid comprised of a semi-rigid sheet-like member of plastic material having a laterally outward extending seating flange matching the contour of, and seated against the upper surface of and locked onto the said rim of the tray, to join the tray and dome lid together into a unitary assembly, the said seating flange having a depending locking flange closely fitting around the flanged rim of the tray and the said locking flange being provided with a plurality of inwardly projecting locking rib means spaced therearound and engaged with the tray rim under the peripheral outer edge thereof to lock the dome lid in place on the tray, the improvement comprising: said seating flange having an outwardly opening thumb notch recess in the outer peripheral edge thereof exposing a portion of the said tray rim through said recess, said thumb notch recess being spaced, around the said seating flange a distance, from one of said locking rib means, such as to enable engagement through said thumb recess of said flanged rim of the tray by the thumb of a person's hand while at the same time enabling engagement of a finger of the person's same hand with the underside of the said locking flange of the dome lid vertically beneath the said one locking rib means for application of a separating force coupled directly and normal to the flanged rim of the tray and the said locking flange to disengage the said one locking rib means from the tray rim.*

*36. A dome lid for locking attachment onto a bottom tray having a surrounding laterally outward extending flanged rim, said lid comprising a semi-rigid sheet-like member of plastic material having a laterally outward extending seating flange matching the contour of and adapted for seating against the upper surface of and locking onto the said rim of the tray, said seating flange having a depending locking flange for fitting closely around the flanged rim of the tray, said locking flange being provided with a plurality of inwardly projecting locking rib means spaced therearound for engagement with the tray rim under the peripheral outer edge thereof to lock the dome lid in place on the tray, and said seating flange having an outwardly opening thumb notch recess in the outer peripheral edge thereof for exposing therethrough a portion of the tray rim, said thumb notch recess being spaced around the said seating flange a distance, from one of said locking rib means, such as to enable engagement through said thumb notch recess of the flanged rim of the tray by the thumb on a person's hand while enabling simultaneous engagement of a finger on the same hand with the underside of said locking flange, vertically beneath the said one locking rib means for application of a separating force coupled directly and normal to the flanged rim of the tray and said locking flange to disengage the said one locking rib means from the tray rim.*

* * * * *

UNITED STATES PATENT AND TRADEMARK OFFICE

CERTIFICATE OF CORRECTION

PATENT NO. : Re. 32,739

DATED : August 30, 1988

INVENTOR(S) : Oskar R. Terauds

It is certified that error appears in the above-identified patent and that said Letters Patent are hereby corrected as shown below:

Column 2, line 23, "sealing" should read --- seating ---; line 30, "sealing" should read --- seating ---. Column 5, line 39, "portion" should read --- portions ---; line 52, "seal" should read --- seat ---. Column 11, line 43, "out" should read --- outer ---. Column 12, line 11, "rounder" should read --- rounded ---; line 32, "strenghtening" should read --- strengthening ---.

Signed and Sealed this

Twenty-eighth Day of February, 1989

*Attest:*

DONALD J. QUIGG

*Attesting Officer*

*Commissioner of Patents and Trademarks*